UNITED STATES PATENT OFFICE.

EDOUARD DODÉ, OF PARIS, FRANCE.

IMPROVEMENT IN METALLIZING MIRRORS.

Specification forming part of Letters Patent No. 59,734, dated November 13, 1866.

*To all whom it may concern:*

Be it known that I, EDOUARD DODÉ, of Paris, in the Empire of France, have invented certain new and useful Improvements in Metallizing Mirrors; and I hereby declare the following to be a full, clear, and exact description of the same.

It has long been sought to discover a means whereby platinum may be fixed on glass; but in spite of all endeavors no one to this day has succeeded in obtaining this result with the requisite conditions of solidity, permanency, and adhesion sufficient for practical every day use.

The object of my invention is the solution of this problem, the means for the accomplishing of which I will now proceed to describe.

Before entering on the description, however, I desire to remark that, as the mirror, by my process is metallized on its outer surface, or, in other words, on the side which first meets the eye, it will be readily seen that all defects, such as air-bubbles, flaws, &c., contained within the glass or on the side opposite the metallized surface—that is to say, on the side which is ordinarily covered with mercury or silver—will be hid behind or covered over by the metal coat or film; and, consequently, by my method every kind of what is ordinarily considered worthless or refuse glass may be used, whatever be its defects or its color, in order to obtain choice looking-glasses and mirrors.

I. *Chemical preparations for obtaining platinum in suspension in fatty bodies to be used in metallizing glasses or mirrors for the purpose of obtaining a direct reflection at the surface.*

1. *Description of the Process.*—I place in a porcelain capsule one hundred grams of platinum rolled thin, and previously washed in boiling water, in order to remove the dirt which it has taken up during its passage through the rolling-mill. After this washing I dissolve it in aqua-regia composed of four hundred grams of pure nitric acid and one thousand grams of pure muriatic acid. In order to hasten its dissolution I place the capsule in a sand bath, which is gradually advanced to a high degree of heat. When the dissolution is effected I continue the fire and evaporate the chloride until it is perfectly dry. When this point is reached the capsule is taken out from the sand-bath, and is left to cool. The product obtained is then removed from the capsule with an ivory knife, and is triturated in a glass or porcelain mortar, when it is well pulverized. I place the powder, which should be of a brilliant orange color, on a glass palette, whose surface is about one (1) meter square, and pour on it drop by drop a quantity of the essence of lavender. I say "drop by drop," because if a large quantity of the lavender-essence were poured suddenly on the concentrated chloride a violent explosion might result; but by following strictly the directions above given there can be no danger, although, when the essence is dropped on the palette, a slight effervescence takes place, which soon ceases, especially if care be taken to stir and spread with a glass muller the matter on the palette, at the same time continuing the dropping of the lavender-essence. After the effervescence has ceased the trituration of the matter should be continued until all the grains shall have completely disappeared. This operation consumes some time; but in two or three hours, if the person charged with the work is an experienced workman, the desired result can be attained. Care should be taken to add as much of the essence of lavender as the platina can retain.

After being assured that the grinding is thorough and complete, and that all the grains have disappeared, I pour the product spread out on the glass palette into a porcelain capsule. The product ought by this time to have absorbed about one thousand four hundred grams of the essence of lavender. In case the absorption has not reached this point the rest of the essence should be poured into the capsule and the mixture should be stirred rapidly with an ivory knife. This knife may also be used during the grinding process if there be need to scrape the muller or to bring back the product to the center of the palette.

The product, when placed in the capsule, should remain quiet for about six days in a place completely removed from dust and moisture. At the expiration of this time it should be poured through a filter of white paper placed in a glass funnel. After the filtering the salts contained by the acids which have been evaporated will be found in the filter. These salts during the six days rest have abandoned the platinum, of which the essence of lavender has taken possession, holding it in suspension in such minute particles that the presence of the metal can with difficulty be ascertained without recourse being had to the desiccation of the product and then to its melting.

The filtered product should be decanted a second time, to make sure that no drops of acid or salts have passed through the filter. The product thus obtained should mark 5° by the acidimeter.

2. *The operation.*—On a glass palette, and with a glass muller, I grind two grams of German litharge previously pulverized in a glass or porcelain mortar, and after this is effected I add two grams of borate of lead, which is ground and mixed with the litharge until the grains or particles have disappeared. In order to effect this grinding I make use of from eight to ten grams of lavender-essence. This quantity should be sufficient. I then mix the product with the platinum, which is in a porcelain capsule, and to effect this mixture I make use of the ivory knife hereinbefore mentioned. The compound should be stirred for about fifteen minutes, (more or less,) and it should also be stirred each time it is employed for metallizing purposes.

The platinum, prepared as above described, has a brown color; but when the solvents are added it loses this color and has a grayish tint. When once applied to the glass it assumes a yellowish tint and almost returns to its original color, which it does not again lose until it is subjected to the baking process, by which it is made to adhere to the glass and to become unchangeable.

The baking is effected in ovens or furnaces, and by the following means: The articles to be baked are separated from contact with the smoke, the effect of which, in certain cases, is extremely pernicious. I obtain this result by placing the fire-box in rear of the oven, by which it is completely separated from the fire-door in front.

The frame-work of the furnace should be formed of cast-iron interlocked panels or plates, so arranged that their number may be increased or diminished according to the dimensions of the objects to be baked.

Another improvement I have devised is to have movable carriage-frames, which are placed in the furnace, and in which can be held a considerable number of glasses of all dimensions.

When the glasses are platinized on but one side, and at their surface, their faces, which are not coated, may be placed together in one section or partition of racks arranged in the movable carriage-frames, and by this means a considerable number of glasses may be baked at one time.

It is necessary to heat the glass to red-heat, in order that the solvents of the composition may adhere to the glass, and then to withdraw it; but according as the glass is more or less fusible it may not be possible to reach that point, or it may be exceeded. Generally, from four to eight hours of heating will suffice for an oven of medium size, according as it is more or less filled with articles to be baked.

When the glass is placed in the furnace and heated it undergoes certain transformations. When the heat first reaches it the platinum becomes greenish in color; then from that color it changes to a clear carmelite, then dark, then a very deep brown, then a bright black, and then, suddenly quitting this tint, it assumes that brilliancy which never after abandons it. The fire is kept up for several minutes more, and the platinum then becomes lost to view, only the glass being seen, which, by the action of the heat, attains a bright cherry-red. The fire is slackened at this point, and when the glass loses its red color the metal will reappear with the same brilliancy which it possessed but a few moments before. The oven with its contents is then left to cool, care being taken to close tightly the "work-holes" and holes through which the operation is watched, lest the air which enters through the holes may cause the glass to break.

I have occasionally employed other means, in order to shorten the above described operation, for making the metallizing compound, as follows: Instead of letting the product remain quiet for about six days, I pour it into a glass funnel provided with a stop-cock. A quantity of boiling water is then poured upon the product, the whole being stirred with a glass spatula. After allowing it to settle for a few moments, the stop-cock is opened, and as the essence of lavender, which holds the metal, is a fatty body, it floats on the surface of the water which flows through the opening left by the cock. At the instant when the water is completely drawn off and the metallizing product is, in its turn, about to pass out through the funnel, the cock is closed. This operation is repeated three or four times, until the product has lost its acid properties, and the hot water is thus made to carry off in a few moments the salts which would otherwise have taken six days to abandon the fatty body which contains the metal.

I employ this method with reluctance, however, for it is the more expensive one, the heat volatilizing a great part of the essence of lavender, which is a very costly substance.

The product thus obtained is treated in other respects as above described, the only effect of the washing being to abridge the six days' rest, and not to dispense with the remainder of the operation, which in no respect should be neglected, if it be desired to obtain a perfect result.

A still simpler method of disengaging the salts and the small quantity of acid which remain in the product can be employed, but only to the detriment of the quality of the product. It is, however, very expeditious, which may, perhaps, render its use desirable in certain cases.

The following is the method: At the instant when the product is removed from the palette and placed in the porcelain capsule, instead of letting it remain quiet for six days to await the deposit of the salts, twelve grams of distilled water should be poured over the product, and the capsule should then be put in a sand-bath at a very moderate heat. The product is then heated until a light vapor emanates therefrom and until the water which has been poured in ascends in little bubbles to the surface of the product. This ebullition is allowed to continue for some minutes, the product being stirred with the ivory knife in order to mix it with the water. The capsule is then taken from the sand-bath, and is left to cool, after which the product is passed through a paper filter, care being taken to avoid pouring out with it any of the water which remains at the bottom of the capsule.

The result of this operation is as follows: The water, which has been heated and well mixed with the product containing the metal and the acid salts, will have taken up the latter, leaving the metal to the essence of lavender. This method is, consequently, less profitable than that of letting the product rest six days, for the reason that in forcing the salts to suddenly leave the platina which they hold in chloride, the salts will carry off with them a certain portion of the platina. Hence a product is obtained less rich, and, consequently, more costly; for in order to recover the platina which remains allied to the salts it is necessary to treat them in the ordinary way, and thus two operations are made necessary instead of only one.

In the above-described process the proportions may be varied, but the results will be less sure and satisfactory. Certain other substances can also be substituted for those indicated, but the same inconveniences will result as when the proportions are varied.

Having now described and particularly ascertained the nature of the said invention, and the manner in which the same is or may be carried into effect, I would observe in conclusion that I lay no claim to the application of platinum to glass for the purpose of producing looking-glasses or mirrors, neither do I claim the use of essence of lavender or of litharge in preparation of the metallizing product; but

What I claim to be new, and desire to secure by Letters Patent, is—

1. The peculiar processes or modes of preparing a product to be employed in metallizing glass with a view to the manufacture or production of looking-glasses, mirrors, and other reflecting surfaces, as hereinbefore described.

2. The peculiar processes for extracting or removing the salts and acids from the metallizing product, as hereinbefore described.

3. As a new article of manufacture, a glass or mirror metallized on its face by the application of platinum, in the manner substantially as hereinbefore described and set forth.

In testimony whereof I have signed my name to this specification before two subscribing witnesses.

ED. DODÉ.

Witnesses:
  E. SHERMAN GOULD,
  C. MARTIN.